June 27, 1967  L. A. DRAVES  3,328,050
VEHICLE OVERLOAD SPRING
Filed June 1, 1965

Lehi A. Draves
INVENTOR.

BY *Clarence A. O'Brien*
*and Harvey B. Jacobson*
Attorneys

United States Patent Office 3,328,050
Patented June 27, 1967

3,328,050
VEHICLE OVERLOAD SPRING
Lehi A. Draves, Rte. 2, Lookeba, Okla. 73053
Filed June 1, 1965, Ser. No. 460,065
7 Claims. (Cl. 280—124)

This invention relates to springs for load carrying motor vehicles and more particularly to auxiliary springs which are adjustably mounted on motor vehicles for use therewith.

In the past, auxiliary overload springs used in conjunction with pickup trucks and the like, once mounted on the truck were constantly in operation, thereby adversely affecting the ride of the truck when it was empty. This caused problems especially when the motor vehicle or truck was used for both carrying heavy loads when auxiliary springs are needed and also was used to transport light loads including passengers, when the auxiliary springs are not needed and the use thereof is undesirable.

It is therefore a primary object of the instant invention to provide overload springs for use with motor vehicles which may be selectively activated and deactivated when the motor vehicle is full or empty.

It is a further object of the present invention to provide a novel attachment means for mounting auxiliary springs on motor vehicles which allows mounting of the auxiliary springs without the necessity of drilling holes in or otherwise deforming the vehicle frame.

It is another object of the present invention to provide auxiliary springs for motor vehicles which may be deactivated when not needed, while remaining mounted on the motor vehicle and when so deactivated are securely retained on the motor vehicle to prevent rattling or other noise when the motor vehicle is in operation.

It is another object of the present invention to provide auxiliary springs for motor vehicles which may be readily fabricated from available materials.

These together with other objects and advantages which will become subsequently apparent reside in the details of construction and operation as more fully hereinafter described and claimed, reference being had to the accompany drawings forming a part hereof, wherein like numerals refer to like parts throughout, and in which:

Figure 1:
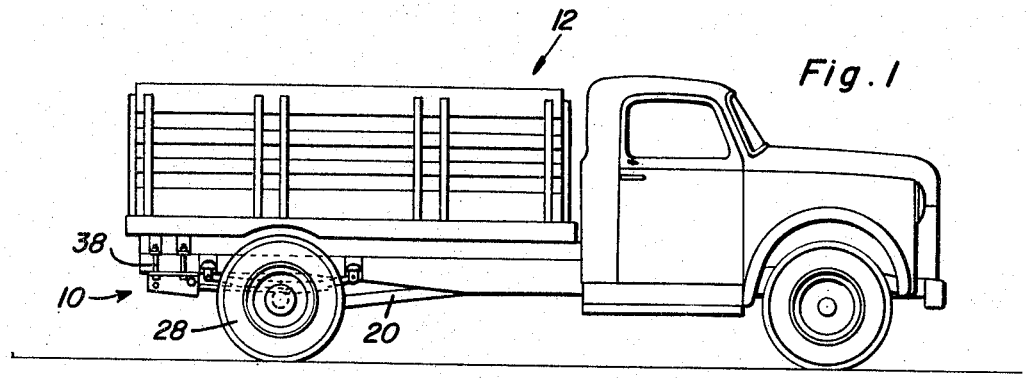
FIGURE 1 is a side elevational view of a motor vehicle such as a flat bed truck including the auxiliary overload spring comprising the present invention mounted in place thereon.

Referring now more particularly to the drawings, and especially to FIGURE 1, reference numeral 10 refers to the auxiliary overload spring comprising the present invention in place on a motor vehicle, such as a flat bed truck 12. The truck 12 is of conventional design, and includes a frame 14, a rear axle housing 16, a differential gear housing 18 and a drive shaft 20. Also included in the running gear of the truck 12 are conventional semi-elliptic laminated leaf springs 22 mounted on the axle housing 16 as at 24, and attached to the frame 14 as at 26. Also included in the running gear of the truck 12 are wheels 28 which are conventionally mounted on a brake drum attached to each outer end of the axle.

The auxiliary overload spring assembly 10 includes a generally U-shaped housing member 30 preferably composed of a substantially rigid metallic material such as steel or the like, and including a flat mounting plate 32 mounted over the top thereof and attached thereto for example by welding 34. The mounting plate 32 includes holes 36 therein, which are adapted to receive bolts 38 therethrough in order to attach the housing 32 to the frame 14. The bolts 38 extend upwardly alongside the frame 14 and extend through a top mounting plate 40 which extends over the top of the frame 14, the bolts 38 being attached to the top mounting plate 40 by the nuts 42.

Figure 2:
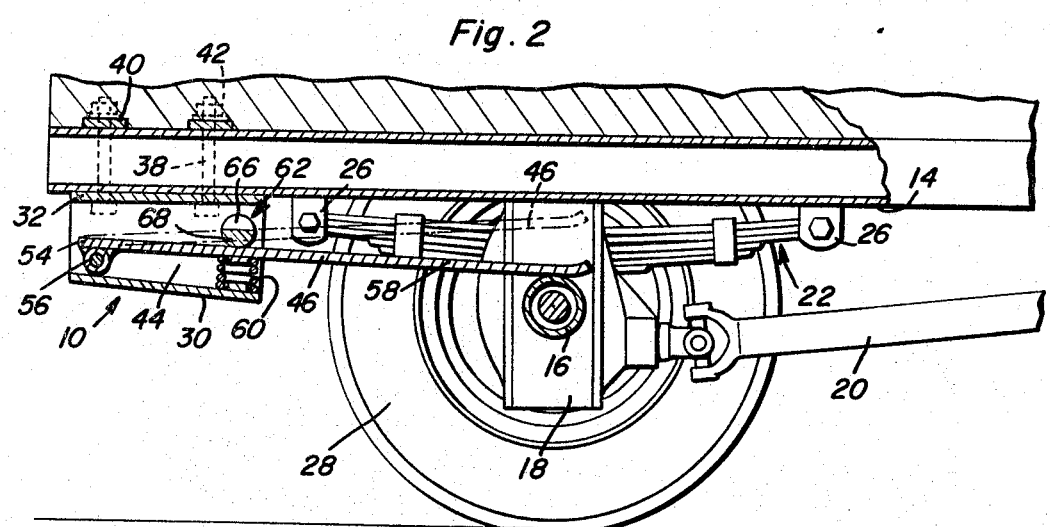
FIGURE 2 is an enlarged partial elevational view partially in section of the motor vehicle of FIGURE 1 illustrating the auxiliary overload spring in greater detail.
Figure 3:
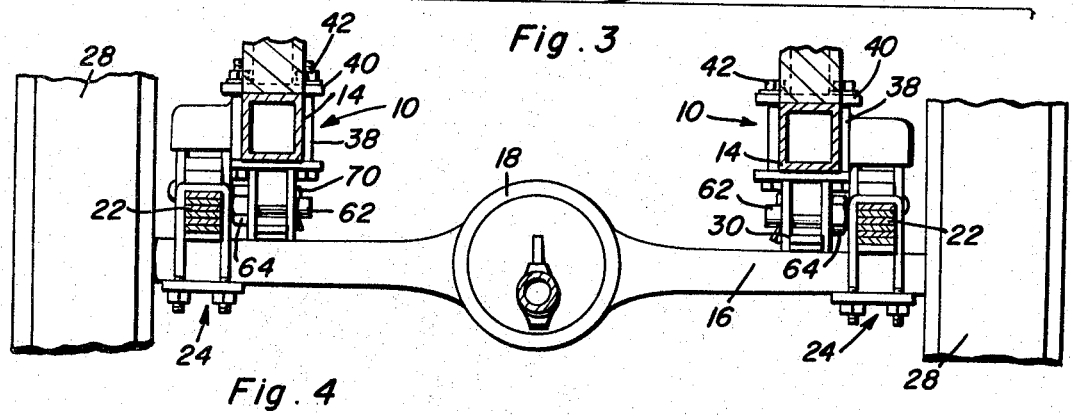
FIGURE 3 is a partial elevational view partially in section illustrating the mounting of the auxiliary overload spring comprising the present invention.
Figure 4:
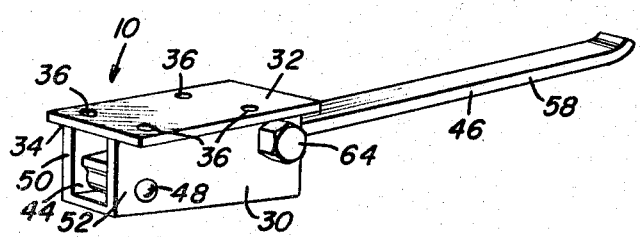
FIGURE 4 is a perspective view of the auxiliary overload spring comprising the present invention.

The housing 30 defines a chamber 44 in which an elongated flexible auxiliary leaf spring member 46 is pivotally mounted. A pin member 48 extends through the walls 50 and 52 of the housing 30. The rear end 54 of the flexible spring member 46 terminates in a depending ear-like opening 56, which opening is mounted on the pin member 48, thereby providing a rotatable or pivotable mounting for the flexible spring member 46. The other end 58 of the flexible spring member 46 extends outwardly of the housing 30 and extends over the axle housing 16 of the motor vehicle 12. The chamber 44 in the housing 30 contains a resilient coil spring 60 mounted therein at the end of the housing opposite the ends at which the pin 48 is mounted. The coil spring 60 is fastened to the bottom of the housing 30 for example by being welded thereto and extends upwardly into contact with the bottom of the flexible member 46, thereby forcing the flexible member upwardly, tending to urge it out of contact with the axle 16. Also mounted in the housing 30 is a cam member 62 which extends transversely across the chamber 44 and through the side walls 50 and 52. The cam member 62 is rotatably mounted in the housing about its longitudinal axis and may be readily rotated from exteriorly of the housing by rotating the head 64 of the member 62. The cam member 62 has a first flattened portion 66 and a second rounded portion 68. The rounded portion 68 extends further from the central axis of the cam member than does the flattened portion, and as is apparent from viewing FIGURE 2, the flexible member 46 is constantly urged upwardly against the cam member 62 by resilient coil spring 60. When the cam member 62 is turned, the flexible spring member 46 is alternatively moved toward and away from the axle housing 16. Thus, viewing FIGURE 2, the flexible member 46 in solid lines is positioned against axle housing 16 when the rounded portion 68 is down, and as illustrated by the dotted lines the flexible member 46 is moved away from the axle housing 16 when the flattened portion 66 is down.

Thus, as is apparent from the above discussion and description of operation of the overload spring assembly 10, the assembly comprises a housing which is mounted to the frame of the motor vehicle and includes a flexible spring member which may be adjusted or selectively moved into and out of engagement with the axle housing of the motor vehicle, thereby allowing for activation or deactivation of the auxiliary spring at the will of the operator. Further, when the spring is moved out of contact with the motor vehicle axle housing and thereby deactivated, the coil spring 60 retains it tightly against the cam member 62 thereby retaining the flexible member 46 in a secured position eliminating any rattle or noise therefrom. The cam member 62 is held in the housing 30 by pin fastener 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. An elongated generally horizontal auxiliary spring for motor vehicles, mounting means for pivotally attaching said auxiliary spring at one end to a motor vehicle for rotation about a horizontal axis extending transversely of the auxiliary spring and engagement of the underside of the other end of said spring with an axle housing of the vehicle, said mounting means including first means opposing the underside of a portion of said spring intermediate its opposite ends and limiting downward swinging movement of said portion of said spring and adjustable second means opposing the upper side of said portion of said spring limiting upward swinging movement of said portion of said spring independent of said first means and relative movement of said axle housing and vehicle.

2. Apparatus in accordance with claim 1 wherein said second means comprises cam means rotatably supported from said mounting means.

3. The combination of claim 2 wherein said cam means comprises an elongated member journaled from said mounting means for rotation about an axis extending transversely of said spring, said elongated member having a first flat portion and a second rounded portion, said rounded portion extending further from said axis than said flat portion, whereby when said member is rotated said flat portion and said rounded portion alternately contact said auxiliary spring.

4. An auxiliary spring for motor vehicles, means for attaching said auxiliary spring to a motor vehicle means for supporting the auxiliary spring in operative engagement with an axle housing of the vehicle, and means for selectively moving the auxiliary spring whereby the auxiliary spring may be activated and deactivated for use with said axle, said supporting means comprising a housing adapted for connection to the frame of a motor vehicle, said housing including means for pivotally supporting one end of said auxiliary spring, the other end of said auxiliary spring extending out of said housing and adapted for operative engagement with the axle housing of said motor vehicle, said moving means comprising cam means rotatably supported in said housing, said cam means positioned in said housing nearer said other end than is said pivotal supporting means, said cam means providing a fulcrum point for said auxiliary spring, said cam means comprises an elongate member extending transversely of said housing above said auxiliary spring, said member being mounted for rotation about its longitudinal axis in said housing, said member having a first flat portion and a second rounded portion, said rounded portion extending further from said axis than said flat portion, whereby when said member is rotated said flat portion and said rounded portion alternately contact said auxiliary spring.

5. Apparatus in accordance with claim 4 wherein said housing further includes resilient means mounted therein adjacent said member and below said auxiliary spring, said resilient means being in constant contact with the underside of said auxiliary spring whereby rotation of said member moves said auxiliary spring and alternately compresses and releases said resilient means.

6. In combination with a motor vehicle having a frame, an axle for mounting wheels thereon and springs, at least one auxiliary spring mounted in the housing, said housing being mounted on said frame, said auxiliary spring comprising an elongate flexible member pivotally mounted at one end in said housing, the other end of said member extending from said housing and adaptable for engagement with said axle, means mounted in said housing for constantly urging said flexible member out of engagement with said axle, and means mounted in said housing for selectively overcoming the urging of said urging means and forcing said flexible member into engagement with said axle, said urging means comprises a coil spring in engagement with the bottom side of said flexible member, said selective means comprising a cam means having a flat side and a rounded side, said cam means being in engagement with the top side of said flexible member, and adapted to be rotated whereby said flat side and said rounded side are alternately engageable with said flexible member.

7. In combination with a motor vehicle having a frame and a spring mounted axle housing, at least one auxiliary elongated generally horizontal spring, mounting means pivotally attaching said spring at one end to said frame for rotation about a horizontal axis extending transversely of said spring and engagement of the underside of the other end of said spring with said axle housing, said mounting means including first means opposing the underside of a portion of said spring intermediate its opposite ends and limiting downward swinging movement of said portion of said spring and adjustable second means opposing the upper side of said portion of said spring limiting upward swinging movement of said portion of said spring independent of said first means and relative movement of said axle housing and vehicle.

References Cited

UNITED STATES PATENTS

| 1,767,750 | 6/1930 | Fisher | 267—16 |
| 2,301,398 | 11/1942 | Haynes | 267—45 |
| 2,969,230 | 1/1961 | Scheublein | 267—16 |
| 3,051,468 | 8/1962 | Lenet | 267—16 |

BENJAMIN HERSH, *Primary Examiner.*

P. GOODMAN, *Assistant Examiner.*